United States Patent [19]

Tobias

[11] Patent Number: 4,984,888

[45] Date of Patent: Jan. 15, 1991

[54] TWO-DIMENSIONAL SPECTROMETER

[75] Inventor: Reginald Tobias, Lancaster, Mass.

[73] Assignee: IMO Industries, Inc., Princeton, N.J.

[21] Appl. No.: 450,027

[22] Filed: Dec. 13, 1989

[51] Int. Cl.$^5$ .............................. G01J 3/28; G01J 3/36
[52] U.S. Cl. ...................................................... 356/328
[58] Field of Search .............. 356/307, 331, 332, 334, 356/326, 328, 333, 324

[56] References Cited

U.S. PATENT DOCUMENTS 2,658,423 4/1972 Elliott ................................. 356/307

OTHER PUBLICATIONS

An Autocollimating F/1 Camera for Use with Echelle Spectrographs Using Image Converters, Meinel, SPIE, vol. 172, Instrumentation in Astronomy III, 1979.

Primary Examiner—Vincent P. McGraw
Assistant Examiner—K. P. Hantis
Attorney, Agent, or Firm—Hopgood, Calimafde, Kalil, Blaustein & Judlowe

[57] ABSTRACT

The invention contemplates a two-dimensional spectrometer wherein a single catadioptric system is both the collimator and the camera for two-pass use of any two-dimensionally dispersed spectrometer. Off-axis aberration effects are minimized by arranging a fiber optic as the light-entrance aperture, on the central optical axis of the spectrometer and in close proximity to or centrally inserted in a two-dimensional array detector at the image plane. In other words, the grating of the spectrometer is also a reflector which folds admitted and dispersed light for return to the image plane along essentially the same path and through the same optical elements as are used on the incoming pass of light to the diffraction grating. The invention is shown for its applicability to each of various types of two-dimensional spectrometer-design configurations.

18 Claims, 3 Drawing Sheets

TWO-DIMENSIONAL SPECTROMETER

BACKGROUND OF THE INVENTION

The invention relates to two-dimensional spectrometers, wherein light to be analyzed enters an aperture and is subjected to cross-dispersion involving use of an echelle grating, and wherein a catadioptric camera images the aperture as a disperse light pattern at a focal plane.

Most optical spectrometers are single-dimensional in their presentation of spectral information. A prism spectrometer disperses light non-linearly as a function of the refractive index of the material of the prism. A grating spectrometer disperses light nearly linearly; the dispersion increases as the groove density increases, and the dispersion increases with the order being observed.

The echelle-grating spectrometer is a species of grating spectrometer, wherein the grating uses a coarsely spaced grating-groove density at a steep grating angle, and wherein operation is typically in the range of the 20th to the 120th order. All of the orders overlap and must be cross-dispersed, in order to present the spectral information without confusion, and the cross-dispersion has been produced both with gratings and with prisms. The initial echelle-grating spectrometers were used with photographic film as a detector, and Videcon TV cameras and multi-tube photomultipliers (with complicated post-spectrometer optics) have been used. It is difficult to observe and decode all of the spectral information presented, due to compactness of the focused format. Therefore, the instruments have been quite large, to obtain as much freedom as possible, for information retrieval.

A problem in imaging the spectral information of any spectrometer is that the dispersion inherently creates an image plane that extends away from the axis of the focusing optic. This off-axis condition creates image aberrations that destroy the ability of the instrument to use the inherent dispersion of the grating (or prism). The most difficult aberration to deal with is astigmatism, which manifests itself as an imaged vertical line in the focal plane, even though originated as a point of light at entrance to the spectrometer. The astigmatism effect increases dramatically as angles increase away from normal incidence upon the optical system. The effect is not too serious in terms of resolution, since the image remains nearly as narrow as the entrance point, but the intensity of the image suffers since the point has been smeared into a line. Optical detectors must be as big as the line is tall, in order to gather and respond to all of the energy. The difficulty with this is that if a detector (such as a photomultiplier) is inherently round, it becomes difficult to measure individual responses to two dispersed wavelengths that are closely adjacent. Solid-state diode arrays have been developed with many tall and narrow detectors in side-by-side array, but these at best provide only 2048 detector elements that are 25-microns wide; and that is not nearly enough to cover the usually desired spectral range with any resolution that is useful. Scanning instruments (monochromaters) are available to scan the spectra across a single detector; but this is time-consuming. And if the desired information is temporal, the time may not be available. Nevertheless, such scanning instruments are precise, albeit mechanically complex and expensive.

There are now available, commercially, two-dimensional arrays that have as many as 2048×2048 (about 4 million) individual detectors, within a 1-cm. square. The desire is to provide a spectrometer configuration that will use this enormous number of detector sites simultaneously. It would seem that the cross-dispersed echelle spectrometer would be the desired design. But the problem is again astigmatism. Since the detectors (pixels) are usually nearly square, there is little room to accommodate this classic aberration, which plagues all spectrometers. It is simply not possible or practical to scale down the design to fit the dispersed spectra onto these 1-cm. square array detectors. Mirrors are forced further off-axis, and the astigmatism worsens.

Bilhorn, et al. papers in *Applied Spectroscopy* (Vol. 41, No. 7, 1987, at pages 1125 to 1135; and Vol. 43, No. 1, 1989, at pages 1 to 11) describe an echelle spectrometer, wherein echelle orders are dispersed along rows of CID (charge-injection) detectors, each containing 388 23-micron-wide elements. The axis of low dispersion corresponds to columns which contain 244 27-micron-tall elements, for an overall photoactive area 6.6 mm×8.7 mm. The spectrometer is a single-pass system, from light source to image plane; it employs a prism for cross-dispersion, and an off-axis Schmidt camera to reduce the size of the focal-plane image to match the sensor dimensions. Allowing for the fact that this spectrometer was limited to 94,672 detector elements (with consequently narrow wavelength range), the results are good, but the optical speed is slow, and the device is large, clumsy and expensive.

BRIEF STATEMENT OF THE INVENTION

It is an object of the invention to provide an improved two-dimensional spectrometer, avoiding disadvantageous features of prior-art devices.

It is a specific object to provide a compact and inherently less expensive spectrometer of the character indicated, with minimized astigmatism, finer inherent resolution and greater wavelength range, as compared with prior spectrometers.

The invention achieves these objects by using a single catadioptric system as the collimator and the camera for two-pass use of any two-dimensionally dispersed spectrometer, off-axis aberration effects are minimized by arranging a fiber optic as the light-entrance aperture, on the central optical axis of the spectrometer and in close proximity to or centrally inserted in a two-dimensional array detector at the image plane. In other words, the grating of the spectrometer is also a reflector which folds admitted and dispersed light for return to the image plane along essentially the same path and through the same optical elements as are used on the incoming pass of light to the diffraction grating. The invention is shown for its applicability to each of various types of two-dimensional spectrometer-design configurations.

DETAILED DESCRIPTION

Several application embodiments of the invention will be described in detail, in conjunction with the accompanying drawings, in which.

Figure 1:
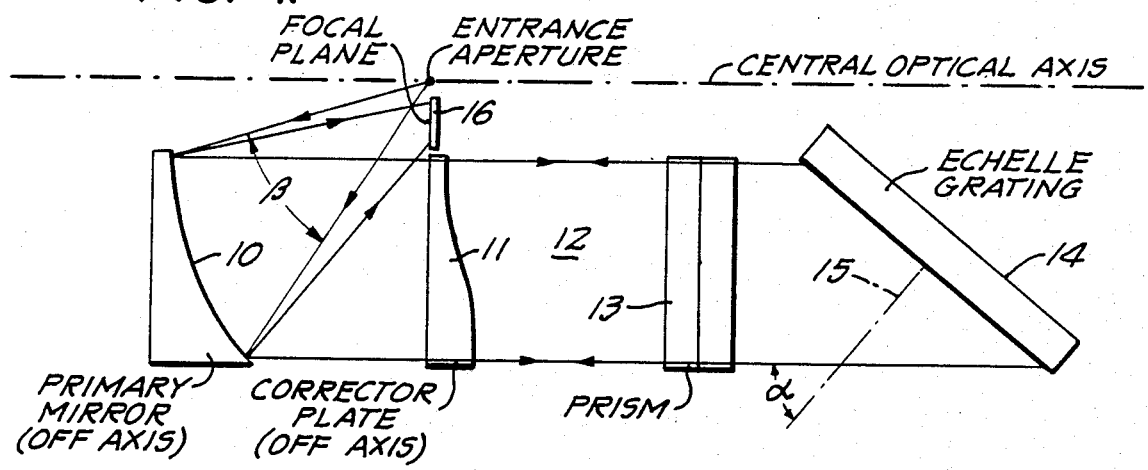
FIG. 1 is an optical block diagram for a first category of two-dimensional spectrometer incorporating the invention.

As noted above, my invention involves use of a single catadioptric system as the collimator and the camera of a two-dimensional spectrometer. By injecting light (to be analyzed) on the central optical axis and directly toward the primary mirror, the light is collimated. In FIG. 1, the catadioptic system is of so-called Wright configuration, comprising an on-axis primary mirror 10 and an off-axis corrector plate 11 whereby, for the spread $\beta$ of light admitted via the entrance aperture, reflected at 10 and refractively corrected at 11, a collimated-light zone 12 is established, parallel to the central optical axis, and directed to a two-dimensional dispersive optical system; the latter is shown as a refractive prism 13 and an echelle grating 14, which is a reflecting device. Prism 13 is oriented transverse to the direction of the collimated incoming light, for a first dimension of refractive spectral dispersion, and a normal 15 to the grooved surface of grating 14 is inclined steeply at angle $\alpha$ away from the undispersed component direction of the collimated light, thus providing the second dimension of spectral dispersion by way of reflection, and at the same time reflecting both dimensional components of dispersion, for a return pass through identically the same optical components 13, 11, 10 and for camera focus at a flat field; the flat field is shown as a two-dimensional device 16 (at the location labeled "Focal Plane") adjacent to the central optical axis and to the point of entry of light to be dispersed and analyzed at the focal plane. It is to be understood that the flat-field device 16 is preferably a two-dimensional photo-responsive array device of the above-noted nature, with upward of $4 \times 10^6$ discrete elements contained within an area 1-cm. square. Such a device is commercially available from Texas Instruments. Electronic means for responding effectively concurrently to all of these discrete elements are available and understood in the art and are therefore neither shown or described at this time.

Figure 2:
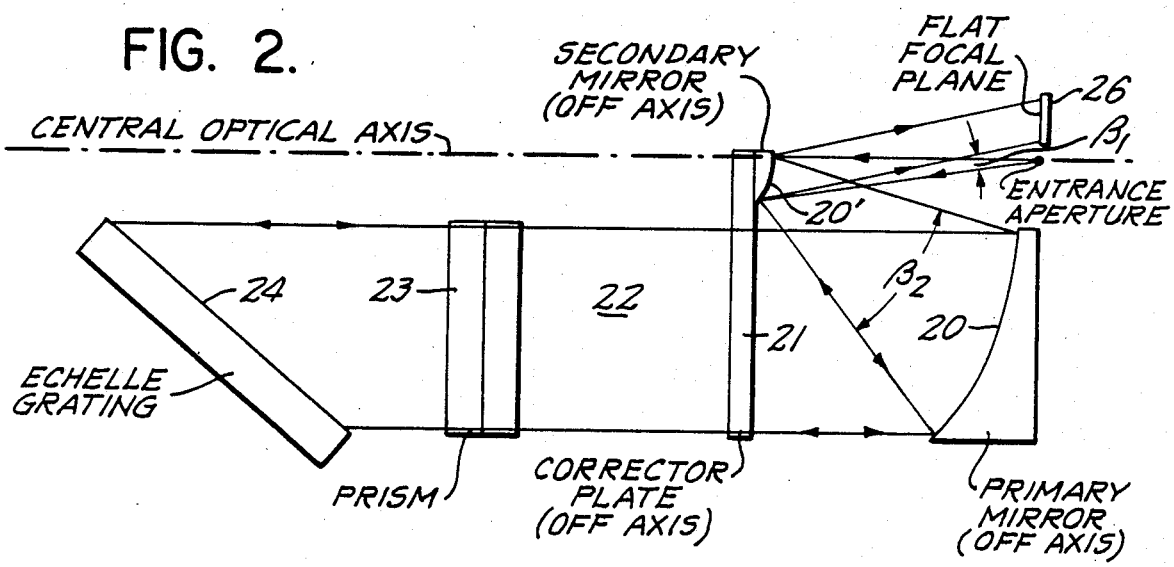
FIG. 2 is a similar diagram for the invention in application to a second category of two-dimensional spectrometer.

In FIG. 2, principles of the invention are shown in application to a two-dimensional spectrometer wherein the single catadioptric system is of Schmidt/Cassegrain configuration, comprising off-axis primary and secondary mirrors 20, 20' and an off-axis corrector plate 21. The spread $\beta_1$ of light admitted via the entrance aperture is reflected and expanded by the secondary mirror 20' to a spread $\beta_2$ for primary reflection at 20 and correction at 21 to establish an off-axis collimated-light zone 22 parallel to the central optical axis. Thereafter, spectral dispersions are effected by a refracting prism 23 and by a steeply inclined echelle grating 24, with reflection of two-dimensionally, spectrally dispersed rays into and through the camera optical system 21, 20, 20' for camera focus at a flat-field detector device 26 which is adjacent to the central optical axis and to the point of entry of light to be dispersed and analyzed at the focal plane.

Figure 3:
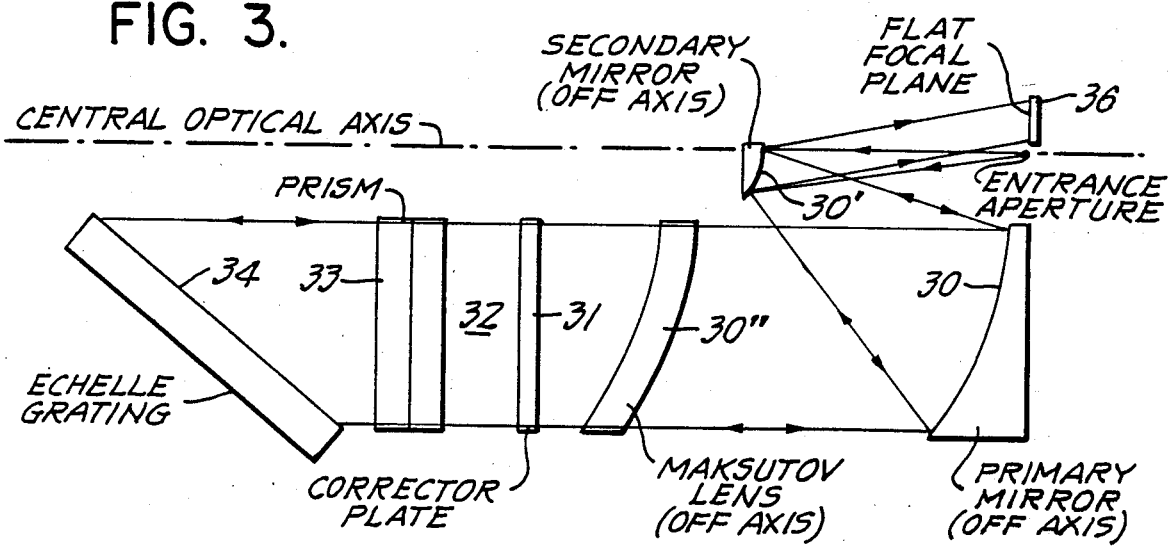
FIG. 3 is another similar diagram for a third category of two-dimensional spectrometer.

In FIG. 3, principles of the invention are shown in application spectrometer wherein the single catadioptric system is of Maksutov configuration, comprising off-axis primary and secondary mirrors 30, 30', an off-axis Maksutov lens 30" and an off-axis corrector plate 31. After correction at 31, the light which enters the entrance aperture on the central optical axis has been converted to a collimated-light region 32. Thereafter, spectral dispersions are effected by a refracting prism 33 and by a steeply inclined echelle grating 34, with reflection of two-dimensionally and spectrally dispersed rays into and through the optical system 31, 30", 30, 30' for camera focus at a flat-field detector device 36 which is adjacent to the central optical axis and to the point of entry of light to be dispersed and analyzed at the focal plane.

Figure 4:
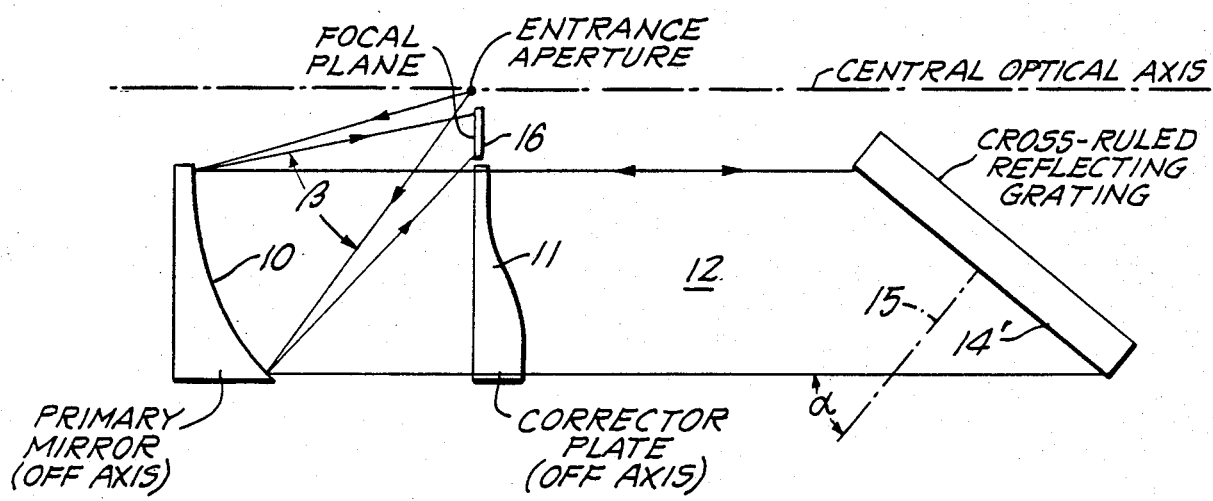
FIG. 4 is a further such diagram to show a modified use of the invention, applicable to any of the spectrometers of FIGS. 1 to 3 but shown in specific application to the spectrometer of FIG. 1.

In the embodiment of FIG. 4, a single cross-ruled reflecting grating 14' is the means of effecting both dimensions of spectral dispersion, thus avoiding need for a refractive-dispersion device such as the prism shown for each of the spectrometers of FIGS. 1 to 3. The inclination of grating 14' with respect to the direction of incident collimated light is such that the inclination applies for one to the exclusion of the other of the cross rulings of grating 14'. Such a grating (14') lends itself for use with any of the catadioptric systems of FIGS. 1 to 3, but is shown in application to the Wright configuration of FIG. 1. Corresponding parts are shown with the same reference numbers and therefore are not further described. Cross-ruled diffraction-grating components, as at 14', may be obtained from Milton Roy, Rochester, N.Y., this being the current source of the prior Bausch and Lomb line of gratings.

Figure 5:
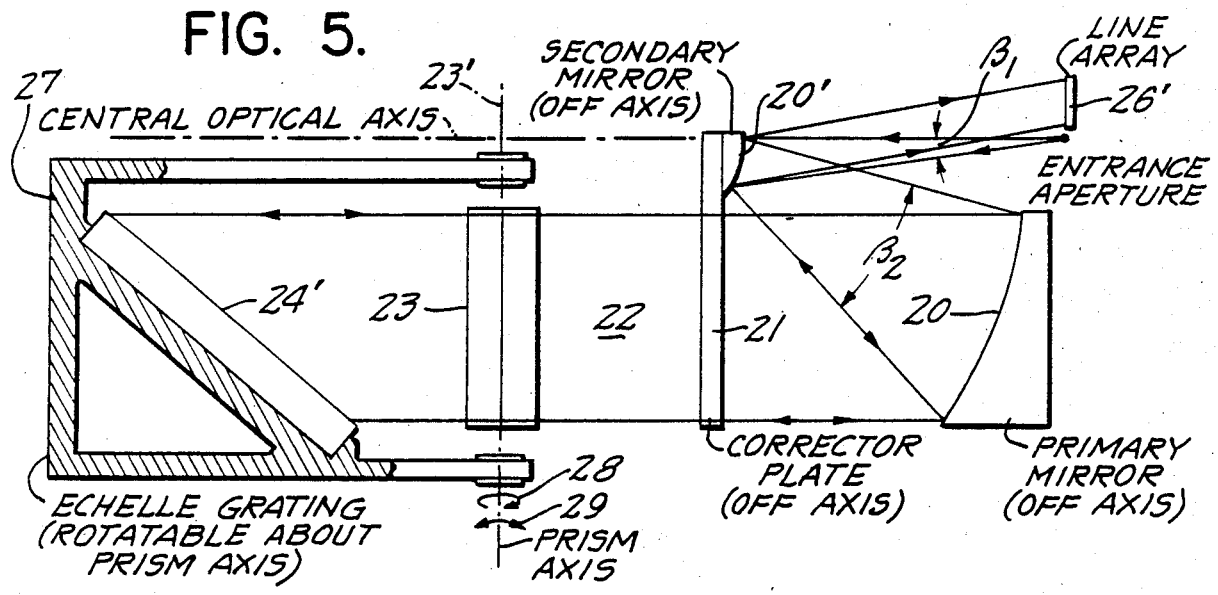
FIG. 5 is a still further diagram to show another modified use of the invention, applicable to any of the spectrometers of FIGS. 1 to 3 but shown in specific application to the spectrometer of FIG. 2.

The arrangement of FIG. 5 utilizes the Schmidt/Cassegrain system of FIG. 2 but differs from FIG. 2 and all of the other described embodiments, in that a line array of detector elements, i.e., a single-dimension ar 26', is mounted in the focal plane of the catadioptric system, and the echelle grating 24' is mounted for bodily rotation about the central longitudinal axis 23' of the fixed prism 23. As shown, a rotatable mount 27 for grating 24' has spaced arms which are journalled for rotation at the respective ends of prism 23. A first arrow 28 will be understood to suggest means for adjustably determining the rotary position of grating 24', whereby the diffraction order presented to the line array 26' may be adjustably selected. And a double-headed arrow 29 will be understood to schematically indicate selective availability of means for reversibly oscillating the rotary displacement of grating 24' whereby the line array 26' is caused to develop a scanning response to sweeps involving a plurality of diffraction orders.

Figure 6:
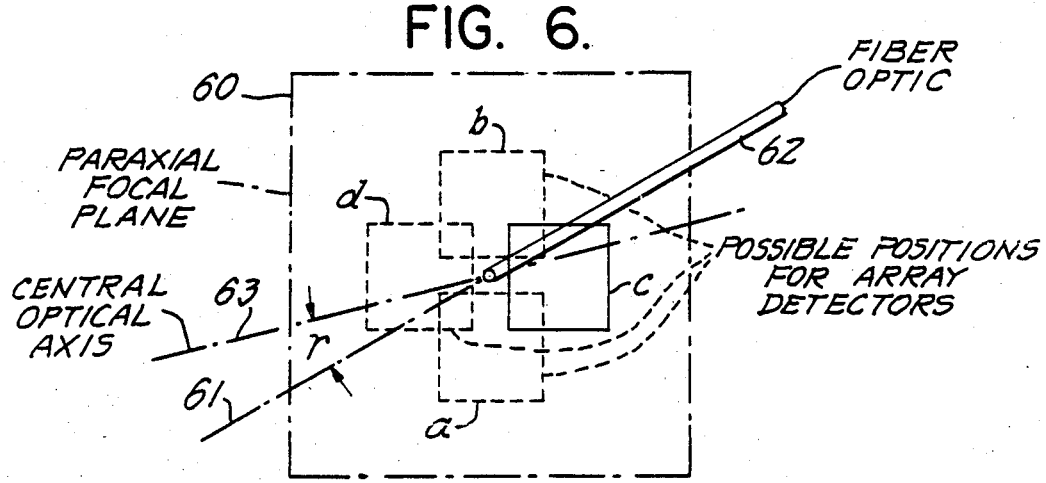
FIG. 6 is a simplified diagram, to enlarged scale, to illustrate light-entry in relation to focal-plane positioning, in use of the invention, for any of the embodiments of FIGS. 1 to 5.

FIG. 6 utilizes a square 60, in phantom outline, to schematically illustrate the paraxial focal plane of the catadioptric system for any of the described spectrometer configurations, the illustration being in relation to the central axis 61 of entering light to be analyzed. For this purpose, a fiber-optic element 62 has its exit plane at the center of plane 60, and element 62 serves as the entrance aperture. It is noted that the center of the focal plane 60 is perpendicular to the central optical axis 63 of the involved spectrometer and that the exit plane of the fiber optic 62 (i.e., the entrance aperture of the spectrometer) is on axis 63 but directionally aligned on axis 61 to flood the mirror of the catadioptric system; in FIG. 6, the angle γ indicates the declination of the exit axis 61 of the fiber optic, below the central optical axis 63, such that maximum light issuing from the fiber optic can impinge upon the first-encountered mirror surface of the involved catadioptric system. I desire to minimize aberrations attributable to off-axis detection within the focal plane 60 and therefore schematically show, at locations a, b, c, d, optional placements of the two-dimensional detector, in as close adjacency as possible to the entrance aperture. Thus, the square at location a may be taken to be the 1-cm square effective area of the above-mentioned two-dimensional detector array, as in FIG. 1, where the array 16 is below but adjacent to the central optical axis; and the square at b may be taken to be the 1-cm square effective area of a similar two-dimensional array, as in FIG. 2, where the array 26 is above but adjacent to the central optical axis.

Figure 7:
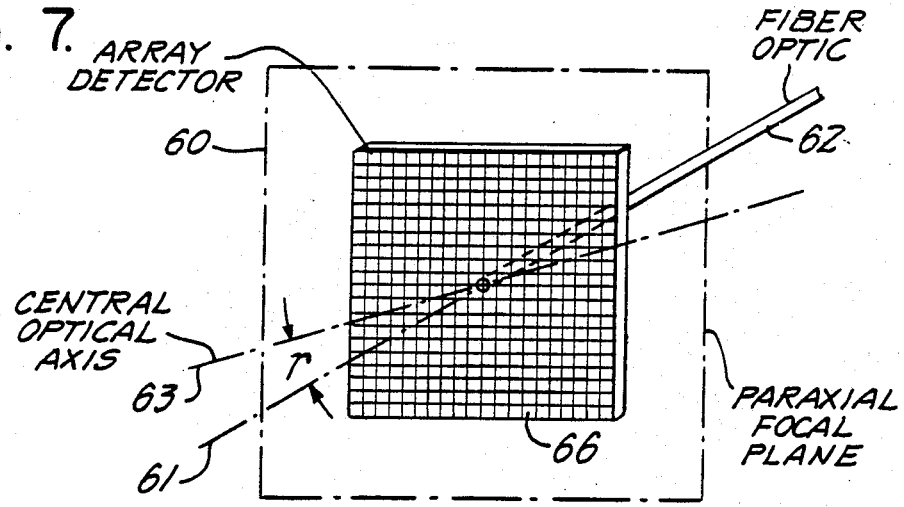
FIG. 7 is another diagram as in FIG. 6, to illustrate another relation of light-entry in relation to focal-plane positioning.

FIG. 7 illustrates that a two-dimensional detector array 66 of the character indicated may be positioned with total symmetry, astride the central optical axis 63. As shown, with a minor sacrifice of central pixels (detector elements), the center of the array may be pierced to the extent of providing an opening for admitting assembly of the fiber optic 62 in the opening, with the exit plane of optic 62 thus positioning the entrance aperture with total symmetry within the focal-plane response field of the detector array 66, whereby off-axis detection is reduced to an absolute minimum, for a given size of detector array.

Figure 8:
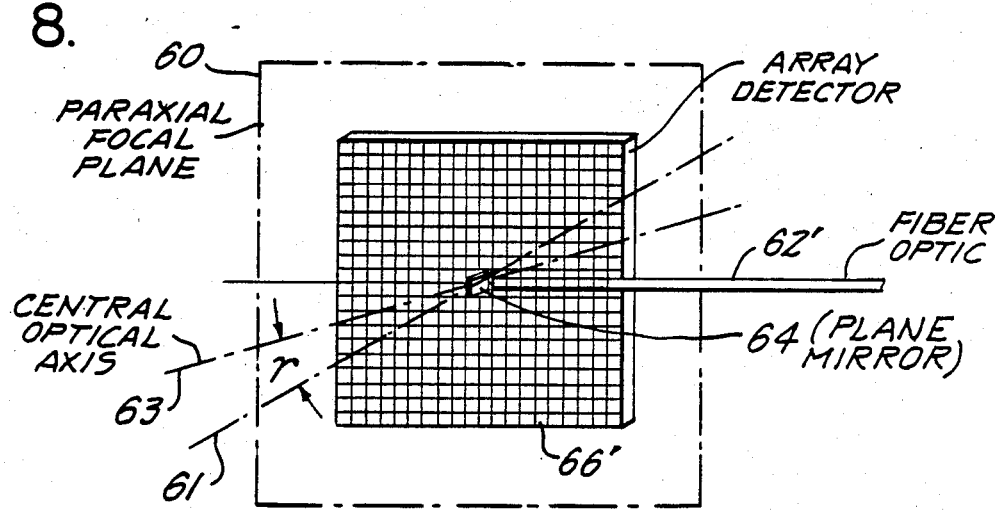
FIG. 8 is also a diagram as in FIG. 6, to illustrate a further relation of light-entry in relation to focal-plane positioning.
Figure 8A:
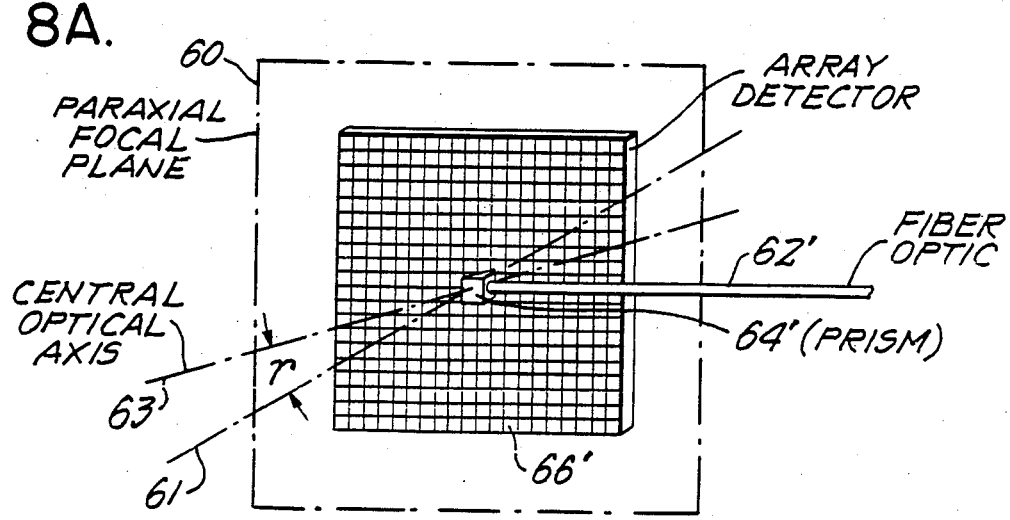
FIG. 8A is a fragmentary diagram to show a modification of a portion of the diagram of FIG. 8.

FIG. 8 will be recognized for its similarities to FIG. 7, except for the fact that light admitted for analysis is delivered by a fiber optic element 62' which is positioned in front of the detector array 66', being directed generally normal to the central axis; light exiting fiber optic 62' is reflected on axis 61, by a small inclined mirror 64 at the center of the front of the detector array. The mirror 64 may be a plane mirror, as seen in FIG. 8, or it may be the hypotenuse surface of an optical prism (e.g., a 45° prism 64'), as seen in FIG. 8A.

What is claimed is:

1. A two-dimensional spectrometer, having a central optical axis for incoming light to be analyzed, a two-dimensional detector array generally transverse to said axis with at least some of its detector elements adjacent to said axis, catadioptric optical means including a mirror system and a refractor/corrector system, each of which systems is a sector of an optical figure of revolution about said central optical axis, said refractor/corrector system producing a collimated beam parallel to but offset from said central optical axis, a two-dimensional dispersive optical device effectively normal to the collimated beam and producing a reflected cross-dispersed beam back through said refractor/corrector system and said mirror system to said detector array.

2. The two-dimensional spectrometer of claim 1, wherein the dispersive optical device is an echelle grating.

3. The two-dimensional spectrometer of claim 1, wherein the dispersive optical device is a cross-ruled reflecting grating.

4. The two-dimensional spectrometer of claim 1, wherein the two-dimensional detector array is astride the central optical axis.

5. The two-dimensional spectrometer of claim 1, wherein an optical fiber has an exit plane positioned on said central optical axis and in the plane of said detector array, for delivery of incoming light to be analyzed.

6. The two-dimensional spectrometer of claim 4, wherein said two-dimensional detector array has a central aperture, and wherein an optical fiber is positioned for incoming-light delivery on said optical axis and through said aperture.

7. The two-dimensional spectrometer of claim 4, wherein a light-delivery system for delivering incoming light at said central optical axis comprises an optical fiber positioned normal to said axis and a reflecting surface at the exit end of said optical fiber, said reflecting surface being positioned on said central optical axis and oriented to direct optical-fiber light to the mirror system of said catadioptric optical means.

8. The two-dimensional spectrometer of claim 7, wherein said reflecting surface is a plane mirror and the exit plane of said optical fiber is normal to the fiber and in spaced adjacency with respect to said mirror.

9. The two-dimensional spectrometer of claim 5, wherein the optical fiber is directionally oriented for delivery of incoming light to the mirror system of said catadioptric optical means.

10. The two-dimensional spectrometer of claim 7, wherein said reflecting surface is the hypotenuse surface of an optical prism.

11. The two-dimensional spectrometer of claim 1, in which said spectrometer is of flat-field off-axis Wright configuration, wherein the mirror system comprises an off-axis primary mirror, wherein the refractor/corrector system comprises an off-axis corrector plate, and wherein the two-dimensional dispersive optical device comprises a prism and an echelle grating.

12. The two-dimensional spectrometer of claim 1, in which said spectrometer is of flat-field off-axis Schmidt-Cassegrain configuration, wherein the mirror system comprises off-axis primary and secondary mirrors, wherein the refractor/corrector system comprises an off-axis corrector plate, and wherein the two-dimensional optical device comprises a prism and an echelle grating.

13. The two-dimensional spectrometer of claim 1, in which said spectrometer is an off-axis Maksutov/Cassegrain configuration, wherein the mirror system comprises off-axis primary and secondary mirrors, wherein the refractor/corrector system comprises an off-axis Maksutov lens and an off-axis corrector plate, and wherein the two-dimensional optical device comprises a prism and an echelle grating.

14. A two-dimensional spectrometer, having a central optical axis for incoming light to be analyzed, a detector array generally transverse to said axis with at least some of its detector elements adjacent to said axis, catadioptric optical means including a mirror system and a refractor/corrector system, each of which systems is a sector of an optical figure of revolution about said central optical axis, said refractor/collector system producing from a point source of incoming light on the central optical axis a collimated beam parallel to but offset from said central optical axis, a two-dimensional dispersive optical device effectively normal to the collimated beam and producing a reflected cross-dispersed beam back through said refractor/corrector system and said mirror system to a focal plane which includes said detector array and said point source of incoming light.

15. The two-dimensional spectrometer of claim 14, in which said dispersive optical device includes an element mounted for rotation about an axis transverse to the direction of the collmated beam.

16. The two-dimensional spectrometer of claim 15, in which said detector array is a one-dimensional linear array, oriented in a direction within the focal plane and parallel to the axis of dispersive-element rotation.

17. The two-dimensional spectrometer of claim 16, wherein means are provided for selective rotation of said dispersive element.

18. The two-dimensional spectrometer of claim 14, wherein said point source is the exit plane of a fiber optic element.

* * * * *